(12) United States Patent
Li et al.

(10) Patent No.: US 11,666,172 B2
(45) Date of Patent: Jun. 6, 2023

(54) COOKING APPLIANCE

(71) Applicant: ZHEJIANG SHAOXING SUPOR DOMESTIC ELECTRICAL APPLIANCE CO., LTD, Zhejiang (CN)

(72) Inventors: Jinzhou Li, Zhejiang (CN); Xiaocong Zeng, Zhejiang (CN)

(73) Assignee: ZHEJIANG SHAOXING SUPOR DOMESTIC ELECTRICAL APPLIANCE CO., LTD

( * ) Notice: Subject to any disclaimer, the term of this patent is extended or adjusted under 35 U.S.C. 154(b) by 0 days.

(21) Appl. No.: 17/789,905

(22) PCT Filed: Apr. 20, 2020

(86) PCT No.: PCT/CN2020/085519
§ 371 (c)(1),
(2) Date: Jun. 29, 2022

(87) PCT Pub. No.: WO2021/134980
PCT Pub. Date: Jul. 8, 2021

(65) Prior Publication Data
US 2023/0050886 A1     Feb. 16, 2023

(30) Foreign Application Priority Data

Dec. 31, 2019  (CN) .......................... 201911419905.1
Dec. 31, 2019  (CN) .......................... 201922502114.7

(51) Int. Cl.
*A47J 27/092*     (2006.01)
*A47J 27/086*     (2006.01)

(52) U.S. Cl.
CPC ........... *A47J 27/092* (2013.01); *A47J 27/086* (2013.01)

(58) Field of Classification Search
CPC ........ A47J 36/16; A47J 27/092; A47J 36/321; F24C 7/08; F24C 7/086
See application file for complete search history.

(56) References Cited

U.S. PATENT DOCUMENTS

2019/0374064 A1     12/2019   Gill et al.

FOREIGN PATENT DOCUMENTS

| CN | 109602273 A | 4/2019 |
|---|---|---|
| CN | 209090836 U | 7/2019 |

(Continued)

OTHER PUBLICATIONS

International Search Report for Application No. PCT/CN2020/085519 dated Sep. 28, 2020, 4 pages.

(Continued)

*Primary Examiner* — Thien S Tran
(74) *Attorney, Agent, or Firm* — Lerner David LLP

(57) ABSTRACT

A cooking appliance comprises a lid (1), an appliance body and an inner cap (3), the lid (1) being arranged on the appliance body in a manner capable of opening and closing the appliance body, the appliance body comprising a heating structure, and the lid (1) comprising: a lid body (4); a baking assembly (5) arranged below the lid body (4), the lid body (4) being provided with a venting passage (6) through which the inside of the cooking appliance communicates with the exterior, the inner cap (3) being detachably mounted to the lid body (4) and located below the baking assembly (5), a lateral wall of the venting passage (6) being provided with a venting hole; a blocking member (27) slidably arranged in the venting passage (6), the blocking member (27) sliding downwards to a bottom of the venting passage (6) when the inner cap (3) is detached, and the blocking member (27) blocking the venting hole when the blocking member (27) is located at a top or a bottom of the venting passage (6). The (Continued)

cooking appliance solves the problem that electrical components inside the lid (1) of a cooking appliance in the prior art are susceptible to moisture.

17 Claims, 9 Drawing Sheets

(56) References Cited

FOREIGN PATENT DOCUMENTS

| | | | |
|---|---|---|---|
| CN | 209285276 U | | 8/2019 |
| CN | 110477762 A | | 11/2019 |
| CN | 110613323 A | | 12/2019 |
| CN | 209826277 U | | 12/2019 |
| CN | 210408079 U | * | 4/2020 |
| CN | 210408158 U | * | 4/2020 |
| JP | S58-22016 A | | 2/1983 |
| JP | S60-149336 U | | 10/1985 |
| JP | 2003-88463 A | | 3/2003 |
| JP | 2014213152 A | | 11/2014 |
| JP | 2019-13704 A | | 1/2019 |
| KR | 20150071088 A | | 6/2015 |
| WO | 2019/032876 A1 | | 2/2019 |

OTHER PUBLICATIONS

Written Opinion for Application No. PCT/CN2020/085519 dated Sep. 23, 2020, 3 pages.
Office Action for Japanese Application No. 2022-539413 dated Jan. 10, 23. 2 pgs.

* cited by examiner

COOKING APPLIANCE

CROSS-REFERENCE TO RELATED APPLICATIONS

The present application is a national phase entry under 35 U.S.C § 371 of International Application No. PCT/CN2020/085519 filed Apr. 20, 2020, which claims priority from Chinese Patent Application Nos. 201922502114.7 and 201911419905.1, both filed on Dec. 31, 2019, all of which are hereby incorporated herein by reference.

FIELD OF THE INVENTION

The invention relates to the technical field of electrical home appliances, and relates in particular to a cooking appliance.

BACKGROUND OF THE INVENTION

Currently, pressure baking cooker mostly use a shared venting passage having a plurality of through holes. However, for different cooking modes, the demands for the venting passage are different. When cooking in the baking mode, outside air needs to enter the inside of the baking assembly whereas, for regular cooking mode, it is necessary to keep the inside air being exhausted(vented) when needed. Air vented during regular cooking mode has a large amount of moisture, and the humid air entering into the baking assembly is very susceptible of affecting the utilization of electrical components inside the baking assembly. Sharing one venting passage can easily cause steam to enter an unused through hole and cause electrical components in a lid to get wet.

In other words, in the prior art the electrical components inside the lid of a cooking appliance have the problem of getting wet easily.

SUMMARY OF THE INVENTION

A main objective of the invention is to provide a cooking appliance so as to solve the problem that electrical components inside the lid of a cooking appliance in the prior art are susceptible to moisture.

To achieve the above-described objective, the invention provides a cooking appliance comprising a lid, an appliance body and an inner cap, the lid being arranged on the appliance body in a manner capable of opening and closing the appliance body, the appliance body comprising a heating structure, and the lid comprising: a lid body; a baking assembly arranged below the lid body, the lid body being provided with a venting passage through which the inside of the cooking appliance communicates with the exterior, the inner cap being detachably mounted to the lid body and located below the baking assembly, a lateral wall of the venting passage being provided with a venting hole; a blocking member slidably arranged in the venting passage, the blocking member sliding downwards to a bottom of the venting passage when the inner cap is detached, and the blocking member blocking the venting hole when the blocking member is located at a top or a bottom of the venting passage.

By providing the baking assembly on the cooking appliance, the cooking appliance can conduct cooking in baking mode, while by providing the inner cap, the cooking appliance can conduct regular cooking, improving the versatility of the cooking appliance, enabling to use one device for two purposes, and greatly improving the versatility of the cooking appliance. Both the baking assembly and the inner cap are vented through the venting passage. By providing the lateral wall of the venting passage with the venting hole, the venting demands of the cooking appliance under various different cooking modes can be satisfied. By providing the blocking member, the unused venting hole can be blocked, thus reducing air intake into the lid, preventing the problem that electrical components in the lid are susceptible to moisture, reducing the influence on electrical components inside the lid, improving the reliability of the functioning of the lid, and lengthening its service life.

Further, the inner cap is provided with a supporting member which abuts against the blocking member and lifts the blocking member when the inner cap is mounted.

Further, the inner cap has a pressure limiting valve assembly which extends into the venting passage and lifts the blocking member when the inner cap is mounted. After the inner cap is mounted below the lid, the pressure limiting valve assembly extends into the venting passage, so as to perform venting. The pressure limiting valve assembly lifts the blocking member, so that the cooking appliance conducts regular cooking. After the inner cap is detached, the blocking member falls back to the bottom of the venting passage under the effect of gravity, so that the cooking appliance conducts cooking in baking mode.

Further, the pressure limiting valve assembly further comprises a valve body and a plurality of supporting feet higher than the valve body and arranged in a spaced-apart manner around an outer periphery of the valve body. The supporting feet abut against and push the bottom of the blocking member. After the inner cap is detached, the blocking member falls back to the bottom of the venting passage under the effect of gravity, so as to block the second through hole, preventing high temperature air from affecting the sealing ring for push bar, and at the same time, leaving open the first through hole, so as to form air circulation inside the baking assembly.

Further, the venting hole comprises a first through hole located at an upper portion of the venting passage and in communication with the baking assembly. The blocking member avoids the first through hole when it slides down to the bottom of the venting passage, and blocks the first through hole when it rises to the top of the venting passage. When the blocking member slides down to the bottom of the venting passage, the cooking appliance conducts cooking in baking mode, and the blocking member leaves open the first through hole, so that the baking assembly is in communication with the venting passage, so as to form air circulation inside the baking assembly when the baking assembly works.

Further, the venting hole comprises a second through hole located at a lower portion of the venting passage. The blocking member blocks the second through hole when it slides down to the bottom of the venting passage, and avoids the second through hole when it rises to the top of the venting passage. When the blocking member slides down to the bottom of the venting passage, the cooking appliance conducts cooking in baking mode, and the blocking member blocks the second through hole, which can prevent high temperature created by cooking in baking mode from affecting structural elements inside the second through hole.

Further, the lid comprises a push bar capable of extending outside the second through hole. When the cooking appliance needs venting during the course of regular cooking, the push bar extends outside the second through hole, so as to push the pressure limiting valve assembly, so that the pressure limiting valve assembly achieves venting.

Further, the lateral wall of the venting passage is further provided with an abutting structure located at a middle portion of the venting passage. When the blocking member is at the bottom or top end of the venting passage, a top or bottom of the blocking member cooperates respectively with the abutting structure in a position limiting manner. The abutting structure limits the movement of the blocking member, so as to prevent the blocking member from falling out of the venting passage, improving the reliability of the functioning of the blocking member.

Further, the abutting structure is in a ring shape and arranged around a circumference of the venting passage. The top of the blocking member has a first abutting flange that cooperates with the abutting structure. The bottom of the blocking member has a second abutting flange that cooperates with the abutting structure. When the blocking member is located at the bottom of the venting passage, the first abutting flange cooperates with the top surface of the abutting structure, so as to prevent the blocking member from falling out. When the blocking member is located at the top of the venting passage, the second abutting flange cooperates with the bottom surface of the abutting structure, so as to prevent the pressure limiting valve assembly from pushing the blocking member out of the venting passage.

Further, the blocking member further comprises a sealing ring arranged on the second abutting flange; and/or arranged on the first abutting flange. By providing the sealing ring, the gap between the venting passage and the blocking member can be sealed, so as to prevent air leakage between the venting passage and the blocking member, enabling the blocking member to reliably block the first through hole or the second through hole.

Further, the blocking member comprises: a top cup, of which a top has a first abutting flange extending outwards; a bottom cup mounted below the top cup, of which a bottom has a second abutting flange extending outwards. By providing the blocking member with a structure of separate parts, mounting of the blocking member in the venting passage is facilitated, reducing assembly difficulty.

Further, a bottom of the top cup has a plurality of first connecting members extending inwards and spaced apart around an inner wall of the top cup, a top of the bottom cup has second connecting members that cooperate with the first connecting members, and the blocking member further comprises a fastening member connecting the first connecting members and the second connecting members. By providing the fastening member, the top cup and the bottom cup are detachable from each other, facilitating the mounting and detaching of the blocking member with the venting passage.

Further, the blocking member has a mesh structure arranged inside the blocking member and located above the venting hole. By providing the mesh structure, the flow rate of air can be reduced, preventing rapidly escaping air from burning a user, and improving the reliability and safety of the utilization of the cooking appliance. The mesh structure can perform the function of blocking foreign objects, and preventing foreign objects from entering the cooking appliance.

Further, the lid body comprises a connecting cylinder and an abutting cylinder which are coaxially arranged to form the venting passage. The connecting cylinder is located above the abutting cylinder, and the connecting cylinder has a first through hole, and the abutting cylinder has a second through hole. By providing the connecting cylinder, realizing the first through hole is facilitated, and at the same time, the connecting cylinder is resistant to high temperature and can reliably function.

Further, an inner wall of the abutting cylinder has an abutting structure extending towards the center of the abutting cylinder. The cylinder wall of the abutting cylinder has an abutting section extending towards the center of the abutting cylinder, and also has the abutting structure extending upwards from the abutting section, and the connecting cylinder abuts against the abutting section and is located outside the abutting structure. The abutting cylinder extends upwards from an inner liner.

Further, the blocking member further comprises a sealing ring that abuts against an inner wall of the venting passage so as to seal the gap between the blocking member and the venting passage. The sealing ring is sleeved to the outer wall of the blocking member, and abuts against the inner wall of the venting passage, so as to seal the gap between the blocking member and the venting passage, preventing air from entering the venting hole when it is not needed to work.

Further, the blocking member comprises a second abutting flange, the baking assembly further comprises a reflecting shell arranged below the lid body and having a passing hole in communication with the venting passage. The area of the passing hole is smaller than the opening area of the venting passage. The blocking member is arranged in the venting passage, and a bottom surface of the second abutting flange can abut against the reflecting shell and get sealed. When the blocking member is at the bottom of the venting passage, the second abutting flange is in contact with the reflecting shell and get sealed, so as to prevent air from flowing into the second through hole. At the top of the blocking member, a first abutting flange is in contact with the abutting structure and get sealed, so that the second through hole is blocked between the first abutting flange and the second abutting flange.

DESCRIPTION OF THE DRAWINGS

The accompanying drawings of the specification, which constitute a part of the application, are used to provide further understanding of the invention. The illustrative embodiments of the invention and their description are used to explain the invention, and do not unduly limit the invention. In the accompanying drawings.

Figure 1:
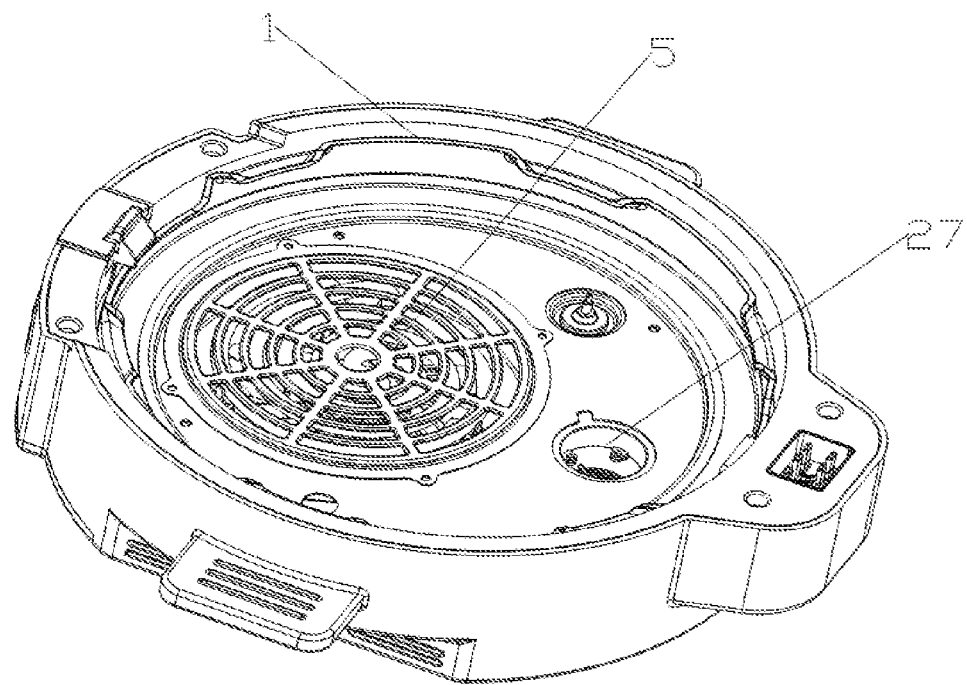
FIG. 1 shows a view from an angle of the lid of a cooking appliance of an optional embodiment of the invention (when the blocking member is located below the venting passage)
Figure 2:
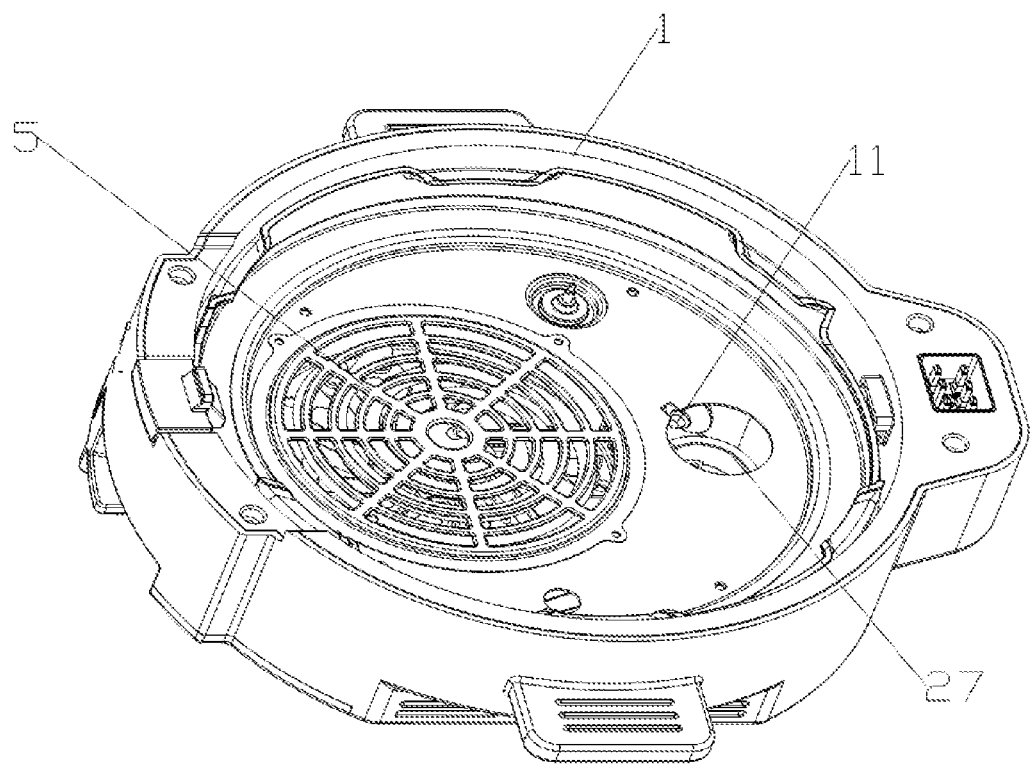
FIG. 2 shows a view from another angle of the lid in FIG. 1 (when the blocking member is located above the venting passage)

In those figures, the above-described figures contain the following references: 1. lid; 3. inner cap; 4. lid body; 5. baking assembly; 6. venting passage; 8. first through hole; 9. intake conduction structure; 11. pushing bar; 12. second through hole; 13. pressure limiting valve assembly; 17. reflecting shell; 27. blocking member; 28. abutting structure; 29. first abutting flange; 30. second abutting flange; 31. top cup; 32. bottom cup; 33. sealing ring; 34. first connecting member; 35. second connecting member; 36. mesh structure; 37. valve body; 38. supporting foot; 39. connecting cylinder; 40. abutting cylinder; 41. face cover; 42. mounting orifice; 43. inner liner; 120. abutting section; 134. first slip structure; 135. second slip structure; 136. driving rib; 137. notch; 138. covering plate; 139. guiding oblique surface; 140. passing hole; 141. sealing silicone.

DETAILED DESCRIPTION OF THE INVENTION

It should be noted that, provided that there is no conflict, the embodiments in the application and their features can be combined with each other. The invention will be described below in reference to the accompanying drawings and in connection with embodiments.

It should be noted that, unless otherwise specified, all technical and scientific terms used by the application have the same meaning as commonly understood by an ordinary person skilled in the art in the technical field to which the application belongs.

In the invention, unless otherwise indicated, directional terms used such as "upper," "lower," "top," and "bottom" generally refer to the directions shown in the accompanying drawings, or refer to the vertical or perpendicular direction of a part itself or the direction of gravity. Similarly, to facilitate understanding and description, "inner" and "outer" refer to the inside and outside of the contour of the respective part itself. However, those directional terms are not used to limit the invention.

The invention provides a cooking appliance so as to solve the problem that electrical parts inside the lid of a cooking appliance in the prior art are susceptible to moisture.

As shown in FIG. 1 to FIG. 15, a cooking appliance comprises a lid 1, an appliance body and an inner cap 3. The lid 1 is provided on the body to cover the latter in a manner capable of opening and closing, and the body comprises a heating structure. The lid 1 comprises: a lid body 4, a baking assembly 5 and a blocking member 27. The baking assembly 5 is arranged below the lid body 4, and the lid body 4 is provided with a venting passage 6 through which the inside of the cooking appliance communicates with the exterior. The inner cap 3 is detachably mounted to the lid body 4 and located below the baking assembly 5, a lateral wall of the venting passage 6 has a venting hole. A blocking member 27 is slidably arranged in the venting passage 6. After the inner cap 3 is detached, the blocking member 27 slides downwards to the bottom of the venting passage 6, and when the blocking member 27 is located at the top or bottom of the venting passage 6, it blocks the venting hole.

By providing the baking assembly 5 on the cooking appliance, the cooking appliance can conduct cooking by baking, and by providing the inner cap 3, the cooking appliance can conduct regular cooking, thus improving the versatility of the cooking appliance, enabling to use one device for two purposes, and greatly improving the versatility of the cooking appliance. Both the baking assembly 5 and the inner cap 3 are vented through the venting passage 6. With the lateral wall of the venting passage 6 being provided with the venting hole, the venting demands of the cooking appliance under various different cooking modes can be satisfied. By providing the blocking member 27, the venting hole, when not needed, can be blocked, thus reducing air intake into the lid, preventing the problem of moisture in electrical components in the lid 1, reducing the effect on electrical components in the lid 1, improving the reliability of the functioning of the lid 1, and lengthening its service life.

Specifically, the venting hole comprises a first through hole 8 located at an upper portion of the venting passage 6 and in communication with the baking assembly 5. The blocking member 27 leaves the first through hole 8 open when it slides down to the bottom of the venting passage 6, and blocks the first through hole 8 when it rises to the top of the venting passage 6. When the blocking member 27 slides down to the bottom of the venting passage 6, the cooking appliance conducts cooking in baking mode, and the blocking member 27 leaves open the first through hole 8, so that the baking assembly 5 is in communication with the venting passage 6, so as to form air circulation inside the baking assembly 5 when the baking assembly 5 works. When the blocking member 27 rises to the top of the venting passage 6, the cooking appliance conducts regular cooking, and the blocking member 27 blocks the first through hole 8, preventing high temperature and humid gases produced by regular cooking from flowing into the baking assembly 5 and improving the reliability of the functioning of the baking assembly 5.

Figure 11:
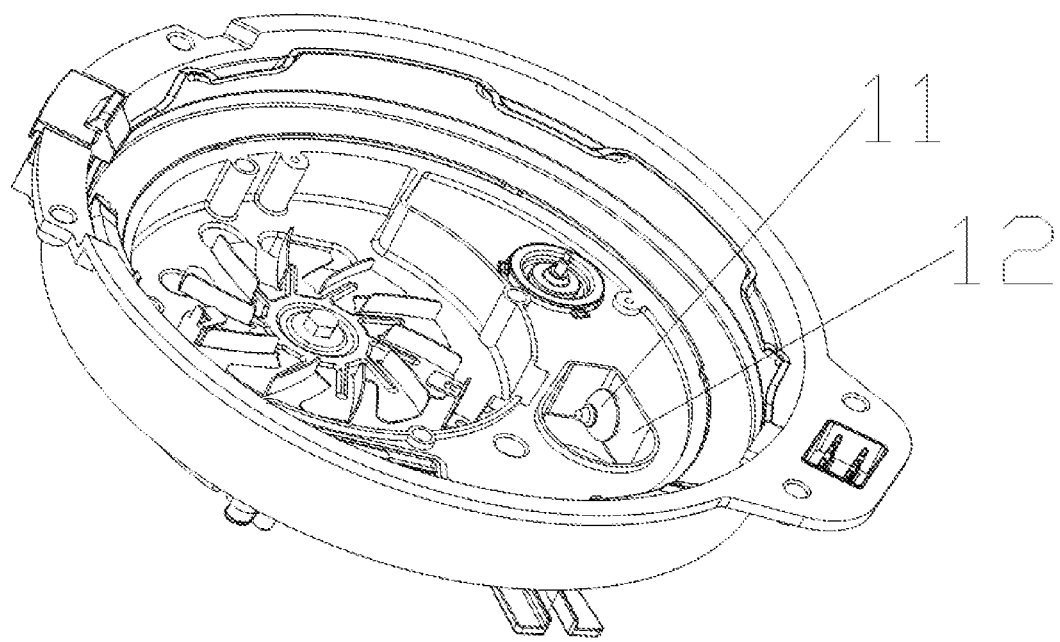
FIG. 11 shows an overall schematic structural view of the lid body in FIG. 10.

As shown in FIG. 11, the venting hole comprises a second through hole 12 located at a lower portion of the venting passage 6. The blocking member 27 blocks the second through hole 12 when it slides down to the bottom of the venting passage 6, and leaves open the second through hole 12 when it rises to the top of the venting passage 6. When the blocking member 27 slides down to the bottom of the venting passage 6, the cooking appliance conducts cooking in baking mode, and the blocking member 27 blocks the second through hole 12, which can prevent high temperature created during cooking in baking mode from affecting structural elements inside the second through hole 12. When the blocking member 27 rises to the top of the venting passage 6, the cooking appliance conducts regular cooking, and the blocking member 27 leaves open the second through hole, so that structural elements in the second through hole 12 work.

Figure 4:
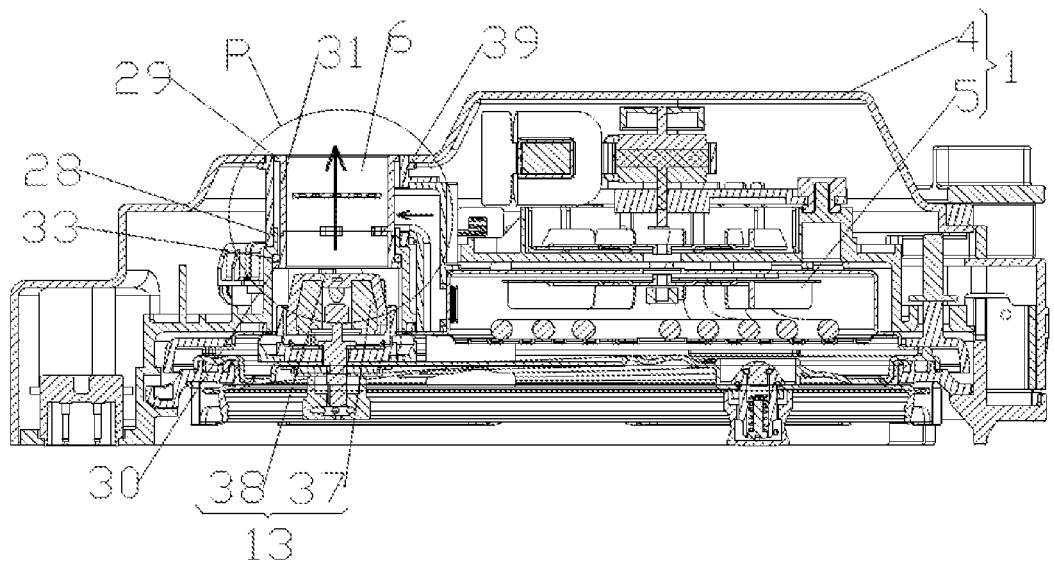
FIG. 4 shows a sectional view of the lid in FIG. 1 after an inner cap is assembled.

As shown in FIG. 4, the inner cap 3 has a pressure limiting valve assembly 13 that, once the inner cap 3 is mounted, extends into the venting passage 6 and lifts the blocking member 27. After the inner cap 3 is mounted below the lid 1, the pressure limiting valve assembly 13 extends into the venting passage 6, so as to perform venting. The pressure limiting valve assembly 13 lifts the blocking member 27, so that the cooking appliance conducts regular cooking. After the inner cap 3 is detached, the blocking member 27 falls back to the bottom of the venting passage 6 under the effect of gravity, so that the cooking appliance conducts cooking in baking mode.

As shown in FIG. 11, the lid 1 comprises a push bar 11 capable of extending outside the second through hole 12. When the cooking appliance needs venting during the course of regular cooking, the push bar 11 extends out of the second through hole 12, so as to push and lift the pressure limiting valve assembly 13, so that the pressure limiting valve assembly 13 achieves venting. The lid 1 further comprises a sealing ring for push bar, which is sleeved on the push bar 11 and abuts against the second through hole 12, so as to seal the gap between the push bar 11 and the second through hole 12, preventing high temperature and humid gases from entering into the lid body 4 when the cooking appliance conducts regular cooking, reducing the effect of high temperature and humid gases on electrical components in the lid body 4, and improving the reliability and safety of the utilization of the lid body 4. In addition, during cooking in baking mode, the baking temperature is very high, and the sealing ring for push bar is very prone to aging in the environment of long-term baking temperature, which causes air leakage between the push bar 11 and the second through hole 12, which has a great potential safety risk. The blocking member 27 blocks the second through hole 12, so as to isolate the sealing ring for push bar, reducing the influence of the baking temperature on the sealing ring for push bar, improving the reliability and stability of the functioning of the sealing ring for push bar, and at the same time lengthening the service life of the sealing ring for push bar.

As shown in FIG. 4, after the inner cap 3 is mounted, the pressure limiting valve assembly 13 lifts the blocking member 27, so as to leave open the second through hole 12, so that the push bar 11 can cooperate with the pressure limiting valve assembly 13, and at the same time, the blocking member 27 blocks the first through hole 8. After the inner cap 3 is detached, the blocking member 27 falls back to the bottom of the venting passage 6 under the effect of gravity, so as to block the second through hole 12, preventing high temperature air from affecting the sealing ring for push bar, and at the same time, leave open the first through hole 8, so as to form air circulation inside the baking assembly 5.

Figure 8:
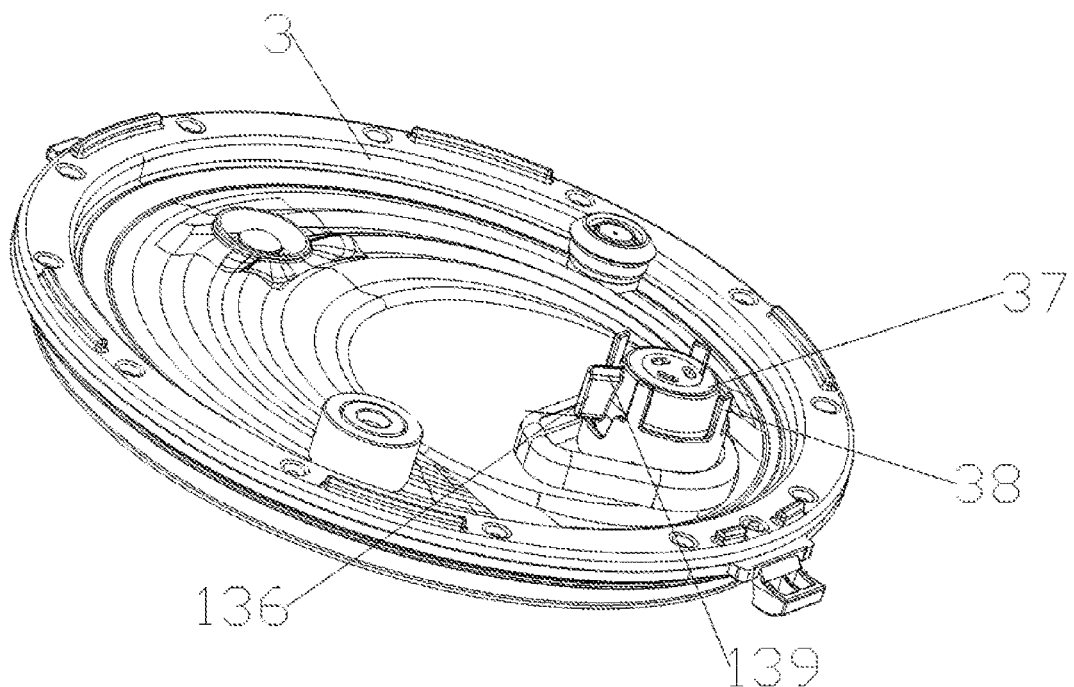
FIG. 8 shows a schematic structural view of the inner cap in FIG. 7.

As shown in FIG. 8, the pressure limiting valve assembly 13 further comprises a valve body 37 and a plurality of supporting feet 38 higher than the valve body 37, and the plurality of supporting feet 38 are spaced apart around the outer periphery of the valve body 37. The supporting feet 38 abut against the bottom of the blocking member 27. The valve body 37 is used for venting and the push bar 11 pushes and lifts the valve body 37. The reason why the supporting feet 38 are configured to be higher than the valve body 37 is to prevent the blocking member 27 from directly pressing against the valve body 37, so that the push bar 11 pushes and lifts the valve body 37.

Figure 9:
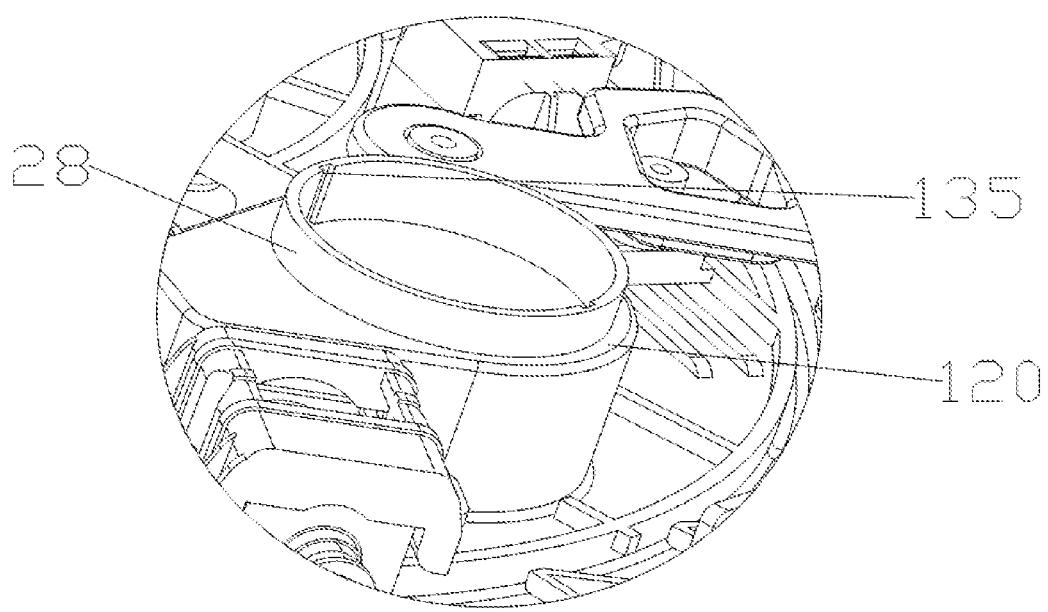
FIG. 9 shows an enlarged view of the location N in FIG. 7.

As shown in FIG. 9, the lateral wall of the venting passage 6 is further provided with an abutting structure 28 located at a middle part of the venting passage 6. When the blocking member 27 is at the bottom or top of the venting passage, the top end or bottom end of the blocking member 27 cooperates respectively with the abutting structure 28 in a position limiting manner. The abutting structure 28 restricts the movement of the blocking member 27, so as to prevent the blocking member 27 from falling out of the venting passage 6, improving the reliability of the functioning of the blocking member 27.

As shown in FIG. 9, the abutting structure 28 is in a ring shape and arranged around the circumference of the venting passage 6. The top of the blocking member 27 has a first abutting flange 29 that cooperates with the abutting structure 28. The bottom of the blocking member 27 has a second abutting flange 30 that cooperates with the abutting structure 28. When the blocking member 27 is located at the bottom of the venting passage 6, the first abutting flange 29 cooperates with the top face of the abutting structure 28, so as to prevent the blocking member 27 from falling out. When the blocking member 27 is located at the top of the venting passage 6, the second abutting flange 30 cooperates with the bottom face of the abutting structure 28, so as to prevent the pressure limiting valve assembly 13 from pushing the blocking member 27 out of the venting passage 6.

Figure 3:
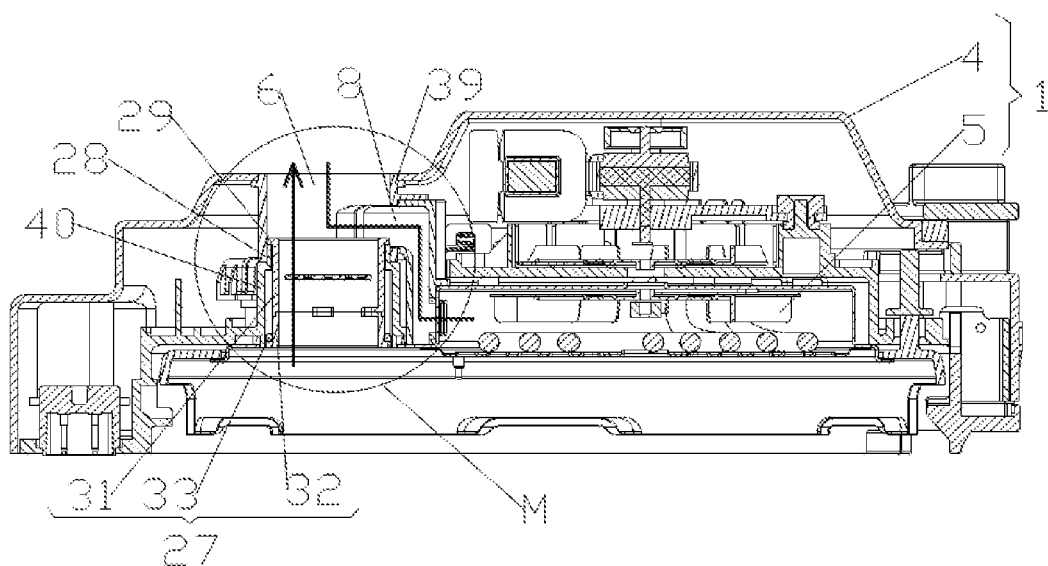
FIG. 3 shows a sectional view from an angle of the lid in FIG. 1.
Figure 13:
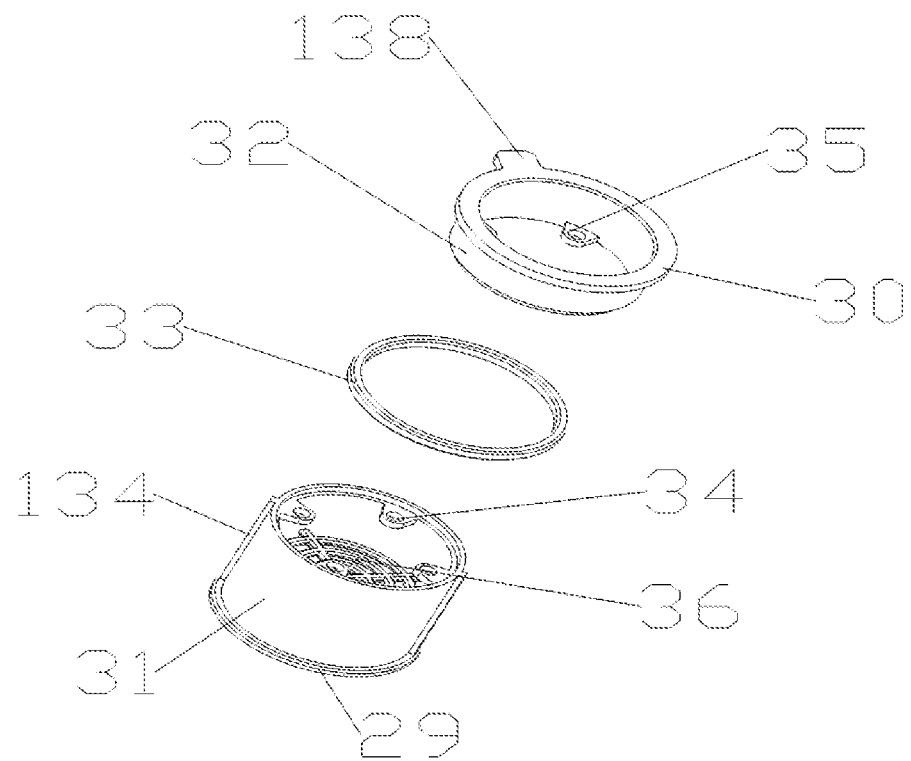
FIG. 13 shows an exploded view of FIG. 12.
Figure 14:
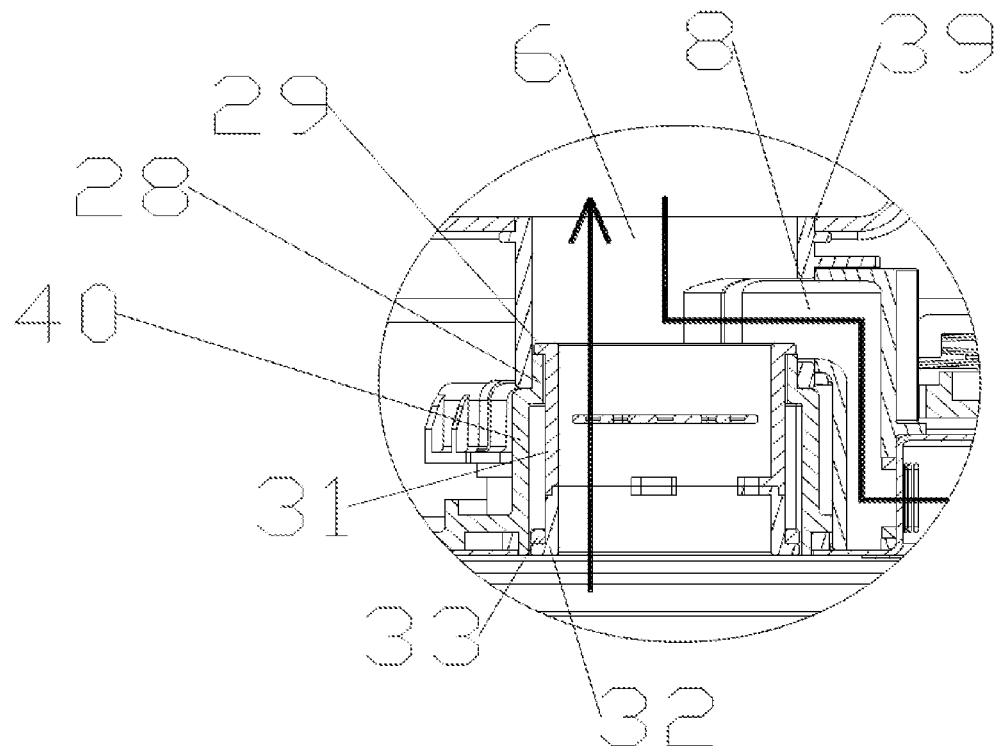
FIG. 14 shows an enlarged view of the location M in FIG. 3.
Figure 15:
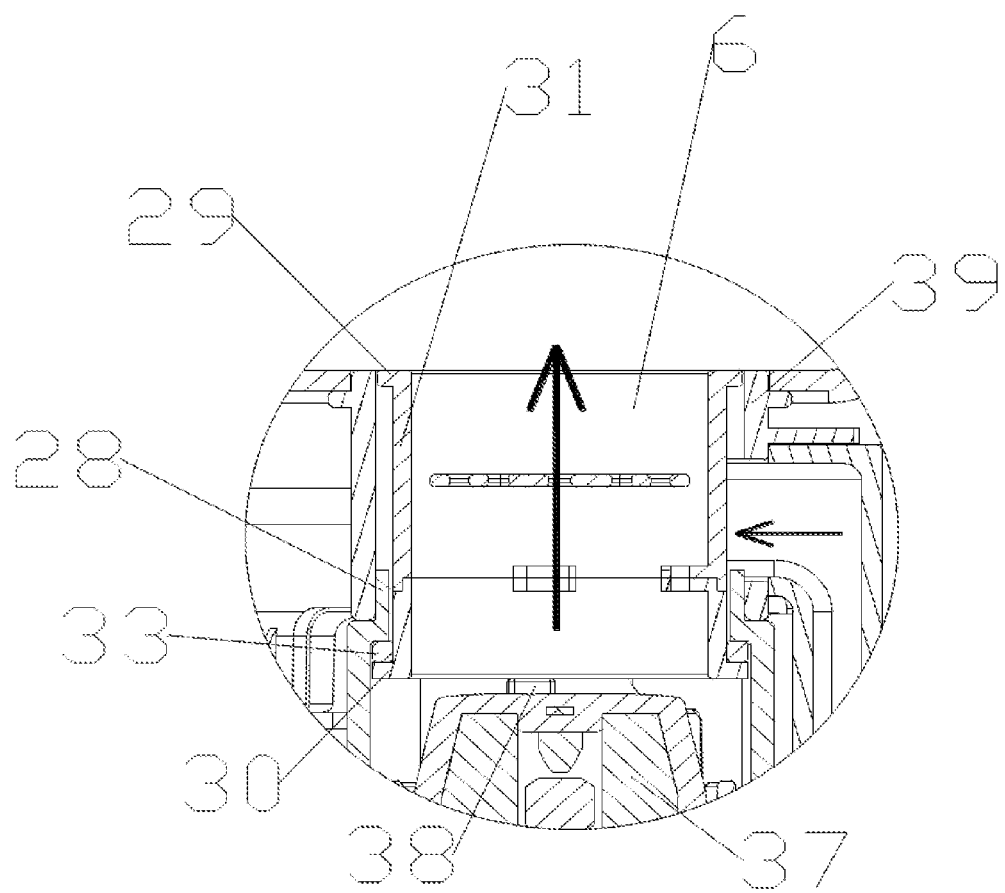
FIG. 15 shows an enlarged view of the location P in FIG. 4.

As shown in FIG. 3, FIG. 4, and FIG. 13, the blocking member 27 further comprises a sealing ring 33 arranged on the second abutting flange 30; and/or arranged on the first abutting flange 29. By providing the sealing ring 33, the gap between the venting passage 6 and the blocking member 27 can be sealed, so as to prevent air leakage between the venting passage 6 and the blocking member 27, enabling the blocking member 27 to reliably block the first through hole 8 or the second through hole 12.

As shown in FIG. 13, the blocking member 27 comprises: a top cup 31 and a bottom cup 32. The top of the top cup 31 is provided with a first abutting flange 29 extending outwards. The bottom cup is mounted below the top cup 31, the bottom of the bottom cup 32 is provided with a second abutting flange 30 extending outwards. The configuration of the blocking member 27 in a structure of separate parts facilitates the installation of the blocking member 27 in the venting passage 6, thus reducing assembly difficulty.

As shown in FIG. 13, the bottom of the top cup 31 has a plurality of first connecting members 34 extending inwards and arranged in a spaced-apart manner around the inner wall of the top cup 31, the top of the bottom cup 32 has second connecting members 35 that cooperate with the first connecting members 34, and the blocking member 27 further comprises a fastening member connecting the first connecting members 34 and the second connecting members 35. By providing the fastening member, the top cup 31 and the bottom cup 32 are detachable from each other, facilitating the assembling and detaching of the blocking member 27 with the venting passage 6.

When assembling the blocking member 27 to the venting passage 6, the top cup 31 can be first inserted into the venting passage 6. The first abutting flange 29 and the abutting structure 28 cooperate with each other in an abutting manner. Then the bottom cup 32 is inserted into the venting passage 6. After the first connecting members 34 and the second connecting members 35 are aligned, the fastening member connects the first connecting members 34 and the second connecting members 35 together, achieving the assembly of the blocking member 27.

Figure 12:
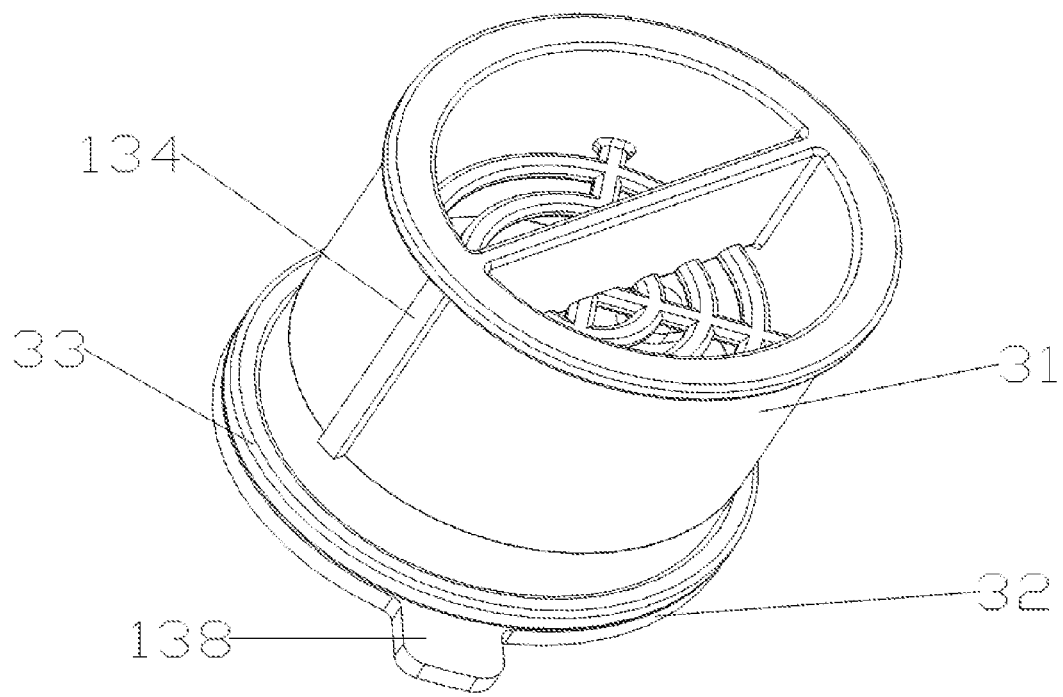
FIG. 12 shows a schematic structural view of the blocking member in FIG. 1.

As shown in FIG. 12 and FIG. 13, the blocking member 27 has a mesh structure 36 provided inside the blocking member 27 and located above the venting hole. By providing the mesh structure 36, the flow rate of air can be reduced, preventing rapidly escaping air from burning a user, and improving the reliability and safety of the utilization of the cooking appliance. The mesh structure 36 can perform the function of blocking foreign objects, and preventing foreign objects from entering the cooking appliance.

As shown in FIG. 13, the mesh structure 36 is located above the first connecting members 34, so as to avoid the pressure limiting valve assembly 13, preventing interference between the pressure limiting valve assembly 13 and the mesh structure 36.

As shown in FIG. 3, the lid body 4 comprises a connecting cylinder 39 and an abutting cylinder 40 that are coaxially arranged to form the venting passage 6. The connecting cylinder 39 is located above the abutting cylinder 40, and the connecting cylinder 39 has the first through hole 8, and the abutting cylinder 40 has the second through hole 12. By providing the connecting cylinder 39, realizing the first through hole 8 is facilitated, and at the same time, the connecting cylinder 39 is resistant to high temperature and can reliably function.

Figure 7:
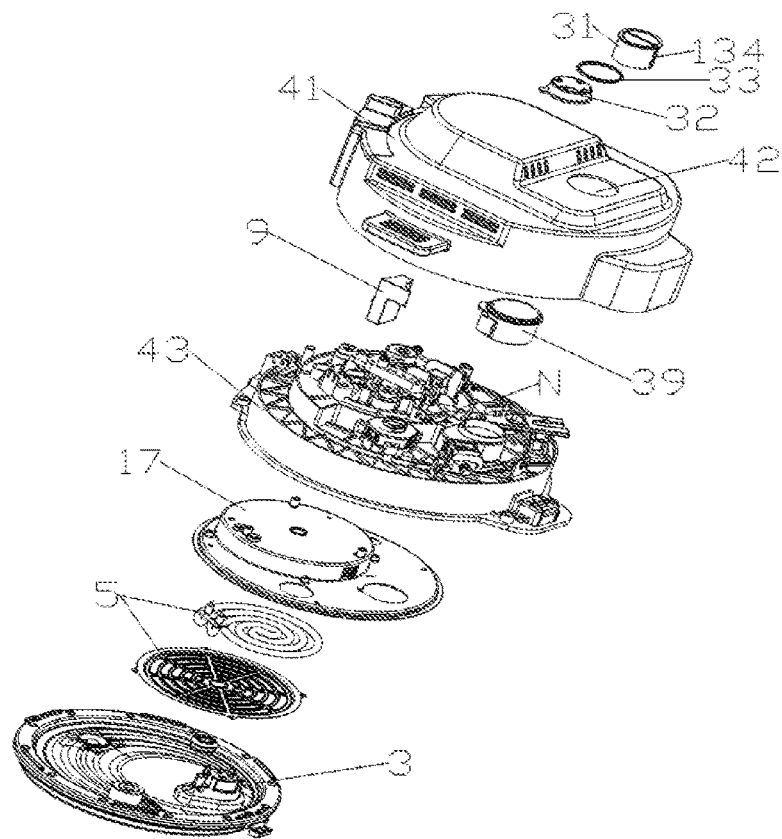
FIG. 7 shows an exploded view of FIG. 4.

As shown in FIG. 7, the lid body 4 comprises a face cover 41 having a mounting orifice 42 inside which the connecting cylinder 39 is mounted. By providing the connecting cylinder 39, realizing the first through hole 8 is facilitated, and at the same time, the connecting cylinder 39 and the face cover 41 are made of different materials, and the connecting cylinder 39 is well resistant to high temperature, so as to ensure the reliability of the functioning of the connecting cylinder 39.

As shown in FIG. 9, the inner wall of the abutting cylinder 40 is provided with an abutting structure 28 extending towards the center of the abutting cylinder 40. The cylinder wall of the abutting cylinder 40 is provided with an abutting section 120 extending towards the center of the abutting cylinder 40, and also provided with the abutting structure 28 extending upwards from the abutting section 120. The connecting cylinder 39 abuts against the abutting section 120 and is located outside the abutting structure 28. The abutting cylinder 40 extends upwards from the inner liner 43.

As shown in FIG. 12, the blocking member 27 further comprises a sealing ring 33 that abuts against the inner wall of the abutting cylinder 40 so as to seal the gap between the blocking member 27 and the abutting cylinder 40. The sealing ring 33 is sleeved to the outer wall of the blocking member 27, and abuts against the inner wall of the abutting cylinder 40, so as to seal the gap between the blocking member 27 and the abutting cylinder 40, preventing air from entering the venting hole which do not need to work.

As shown in FIG. 1, the blocking member 27 comprises a second abutting flange 30, the baking assembly 5 further comprises a reflecting shell 17 arranged below the lid body 4. The reflecting shell 17 has a passing hole 140 in communication with the venting passage 6 The area of the passing hole 140 is smaller than the opening area of the venting passage 6. The blocking member 27 is arranged inside the venting passage 6, and the bottom face of the second abutting flange 30 can abut against the reflecting shell 17 and get sealed. When the blocking member 27 is at the bottom of the venting passage 6, the second abutting flange 30 is in contact with the reflecting shell 17 and get sealed, so as to prevent air from flowing into the second through hole 12; whereas at the top of the blocking member 27, the first abutting flange 29 is in contact with the abutting structure 28 and get sealed, so that the second through hole 12 is blocked in an area between the first abutting flange 29 and the second abutting flange 30. The passing hole 140 is in a circular shape, so as to cover an irregular venting cavity, and at the same time facilitate the blocking member 27 abutting against the reflecting shell 17.

It should be noted that, there can be multiple ways the blocking member 27 blocks the first through hole 8 or the second through hole 12. Description is made by using the blocking member 27 blocking the first through hole 8 as an example.

In a first circumstance, the blocking member 27 is blocked at the first through hole 8 by means of a sealing structure, so as to seal the first through hole 8.

In a second circumstance, an outer wall of the blocking member 27 is in direct contact with the first through hole 8, so as to seal the first through hole 8.

In a third circumstance, the blocking member 27 is spaced apart from the first through hole 8, the sealing ring 33 is engaged in a snap-fit manner between the second abutting flange 30 and the abutting structure 28, and the first through hole 8 is in communication with the exterior. It is enough to ensure that air inside the appliance body would not flow into the first through hole 8.

In a fourth circumstance, the blocking member 27 is spaced apart from the first through hole 8, the top of the blocking member 27 is contact-sealed the with the face cover 41 by means of the first abutting flange 29, and the sealing ring 33 is engaged in a snap-fit manner between the second abutting flange 30 and the abutting structure 28. It is enough to limit the first through hole 8 between the first abutting flange 29 and the second abutting flange 30.

It should be noted that, because the second through hole 12 is located below the first through hole 8, the third circumstance does not exist.

As shown in FIG. 9 and FIG. 12, the outer circumferential surface of the blocking member 27 has a first slip structure 134, and the inner wall of the venting passage 6 has a second slip structure 135 that cooperates with the first slip structure 134. The first slip structure 134 is an embossment, and the second slip structure 135 is a slot. Or, the first slip structure 134 is a slot, and the second slip structure 135 is an embossment. With the cooperation between the first slip structure 134 and the second slip structure 135 the blocking member 27 can stably move, improving the stability of the functioning of the blocking member 27. The first slip structure 134 extends along the axial direction of the blocking member 27, and there are a plurality of the first slip structures 134 arranged around the circumference of the blocking member 27 in a spaced-apart manner.

It should be noted that, the first slip structure 134 can be provided only on the top cup 31, or the first slip structure 134 can be provided only on the bottom cup 32, or the first slip structure 134 is provided both on the top cup 31 and on the bottom cup 32.

Figure 5:
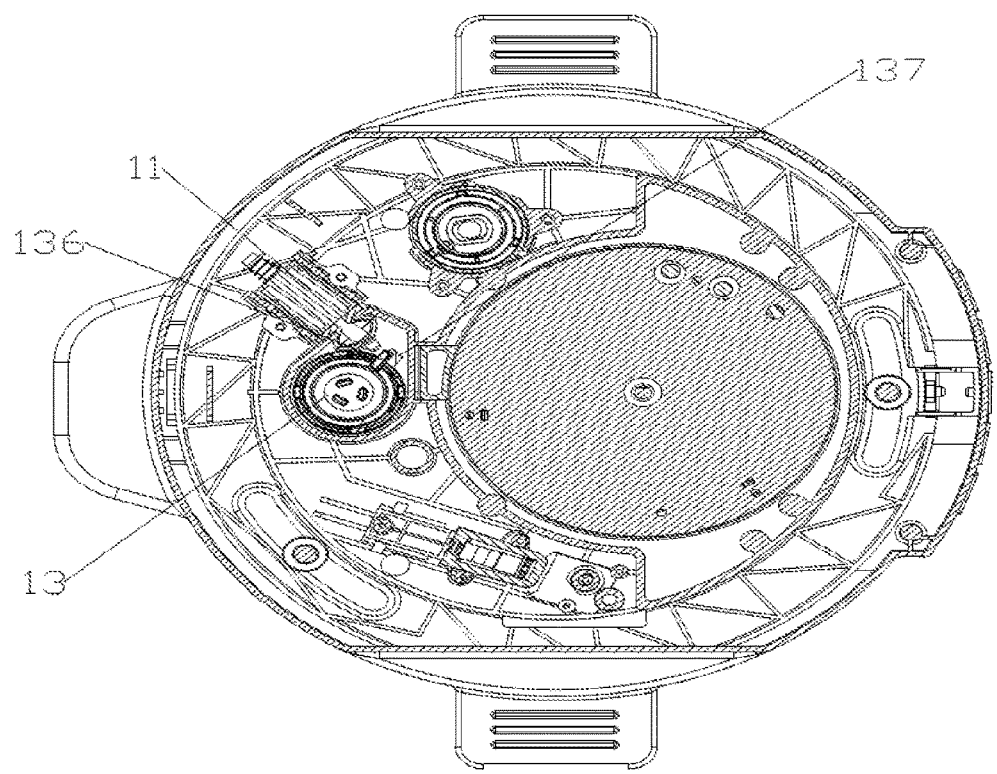
FIG. 5 shows a schematic view of the position relationship between the pressure limiting valve assembly in FIG. 4 and a pushing bar.
Figure 6:
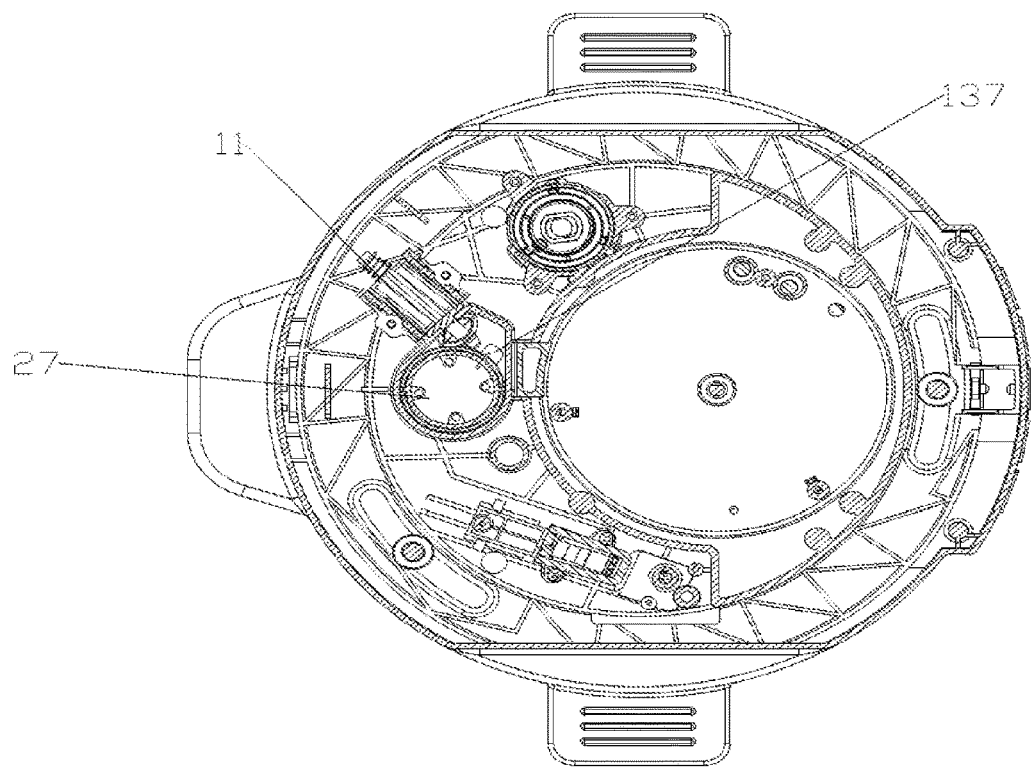
FIG. 6 shows a schematic view of the position relationship between the blocking member in FIG. 4 and the pushing bar.

As shown in FIG. 5 and FIG. 8, the pressure limiting valve assembly 13 has a driving rib 136 extending horizontally, the reflecting shell 17 has a notch 137 for the driving rib 136 to pass through, and the push bar 11 push against the driving rib 136, so as lift the pressure limiting valve assembly 13 for venting. The bottom of the blocking member 27 has a covering plate 138 for sealing the notch 137, so as to ensure the tightness of the area where the push bar 11 is located. The notch 137 is in communication with the passing hole 140.

As shown in FIG. 8, the top of the driving rib 136 has a guiding oblique surface 139, so as to facilitate the driving rib 136 extending into the notch 137, so that the inner cap 3 can be rapidly assembled to the lid 1.

Figure 10:
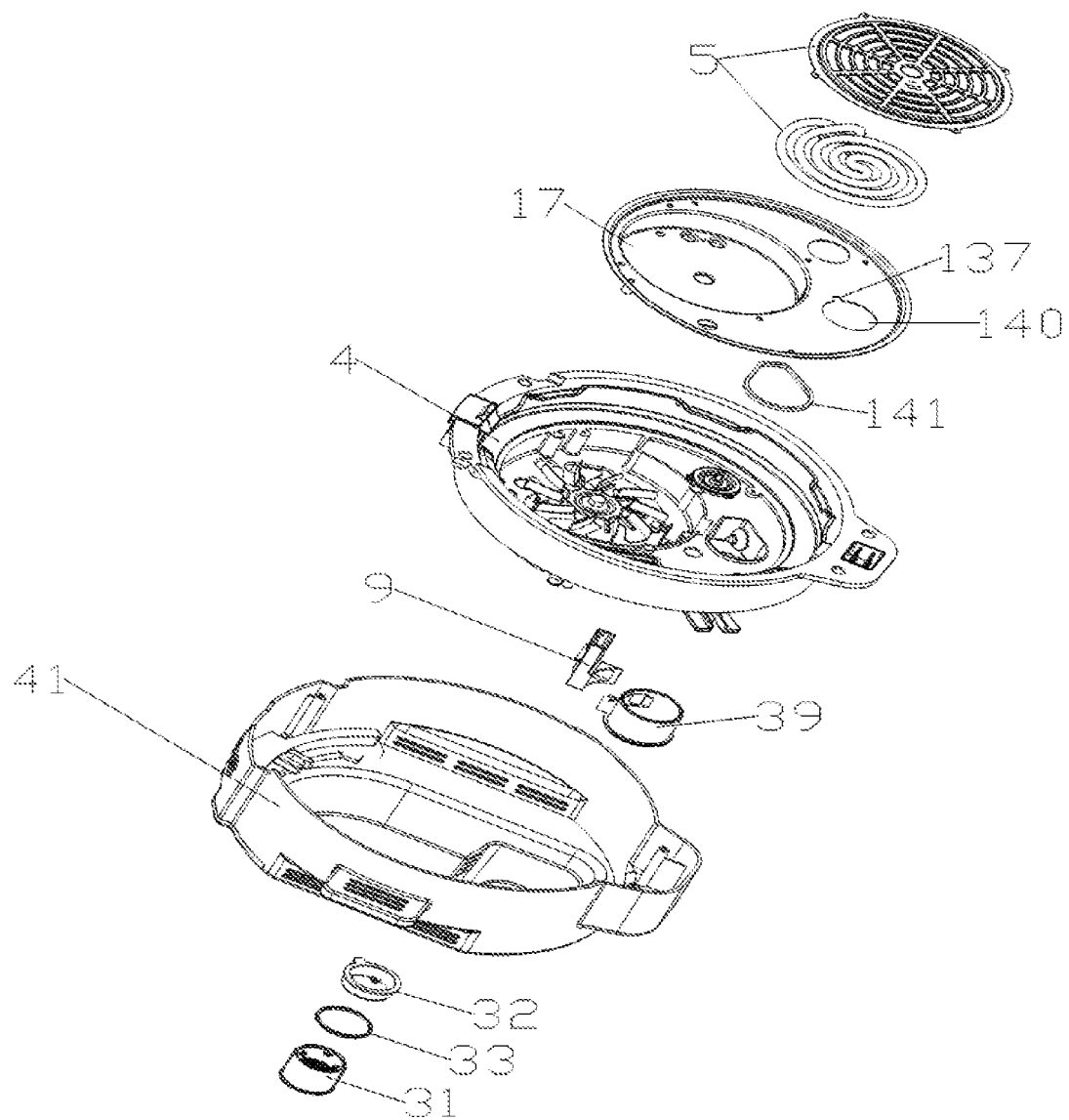
FIG. 10 shows an exploded view of the lid in FIG. 1.

As shown in FIG. 10, the lid 1 further comprises sealing silicone 141 provided between the lid body 4 and the reflecting shell 17 and located at the venting passage 6, so as to prevent air from entering into the area between the lid body 4 and the reflecting shell 17 through the venting passage 6.

Embodiment 2

It differs from embodiment 1 in that the structure pushing against the blocking member 27 is different.

In this embodiment, the inner cap 3 is provided with a supporting member. After the inner cap 3 is mounted, the supporting member abuts against the blocking member 27, and lifts the blocking member 27. After the inner cap 3 is mounted to the lid 1, the supporting member extends into the venting passage 6 and lifts the blocking member 27. It is similar to the function in embodiment 1 and is not described further here.

Embodiment 3

It differs from embodiment 1 in that the position where the pressure limiting valve assembly 13 pushes against the blocking member 27 is different.

In this embodiment, the pressure limiting valve assembly 13 further comprises a valve body 37 and a plurality of supporting feet 38 higher than the valve body 37 and spaced-apart around the outer periphery of the valve body 37. The supporting feet 38 abut against and push second connecting members 35. The supporting feet 38 push against the second connecting members 35, so as to prevent the supporting feet 38 from detaching from the blocking member 27, so that the blocking member 27 is stably raised.

Specifically, the distance between the top face of the supporting feet 38 and the top surface of the valve body 37 is larger than the distance between the second connecting members 35 and the bottom surface of the bottom cup 32. With this configuration, the valve body 37 has a certain moving space, so that the push bar 11 can lift the valve body 37 for venting. Obviously, the embodiments described above are merely some but not all of the embodiments of the invention. All other embodiments obtained by a person skilled in the art based on the embodiments in the invention without creative labor are within the scope of protection of the invention.

It should be noted that, the terms used herein are merely for describing specific modes of realization, and not intended to limit exemplary embodiments according to the application. As used herein, unless otherwise specifically indicated elsewhere herein, the singular form is intended to also include the plural form. In addition, it should be noted that, when a term such as "comprise" and/or "include" is used in this specification, it indicates there exists a feature, step, functioning, part, assembly, and/or their combination.

It should be noted that, the terms such as "first" and "second" are used to distinguish similar objects, and not necessarily to describe a particular order or sequence. It should be understood that information used in this way can be exchangeable in appropriate circumstances, so that the embodiments of the application described herein can be realized in an order other than illustrated or described herein.

What has been described above are merely preferred embodiments of the invention, and is not to limit the scope of the invention. To a person skilled in the art, the invention can be subject to various modifications and changes. Any modification, equivalent replacement, and improvement made within the spirit and principle of the invention shall fall within the scope of protection of the invention.

The invention claimed is:

1. A cooking appliance comprising:
   an appliance body comprising a heating structure;
   an inner cap; and
   a lid configured to open and close the appliance body, the lid comprising:
   a lid body comprising a venting passage through which an inside of the cooking appliance communicates with an exterior, the venting passage comprising a lateral wall including two through holes;
   a baking assembly arranged below the lid body, the inner cap detachably mounted to the lid body and located below the baking assembly; and
   a blocking member slidably arranged in the venting passage, the blocking member configured to:
   slide downwards to a bottom of the venting passage when the inner cap is detached from the lid body; and
   block one of the two through holes and avoid blocking the other of the two through holes when the blocking member is located at a top or the bottom of the venting passage.

2. The cooking appliance according to claim 1, wherein the inner cap comprises a supporting member which abuts against the blocking member and lifts the blocking member when the inner cap is mounted to the lid body.

3. The cooking appliance according to claim 1, wherein the inner cap comprises a pressure limiting valve assembly which extends into the venting passage and lifts the blocking member when the inner cap is mounted to the lid body.

4. The cooking appliance according to claim 3, wherein the pressure limiting valve assembly comprises:
   a valve body; and
   a plurality of supporting feet higher than the valve body and arranged in a spaced-apart manner around an outer periphery of the valve body, the supporting feet abutting against and pushing a bottom of the blocking member.

5. The cooking appliance according to claim 1, wherein a first through hole is located at an upper portion of the venting passage and in communication with the baking assembly, and the blocking member is further configured to:
   avoid the first through hole when the blocking member slides down to the bottom of the venting passage; and
   block the first through hole when the blocking member rises to the top of the venting passage.

6. The cooking appliance according to claim 1, wherein a second through hole is located at a lower portion of the venting passage, and the blocking member is further configured to:
   block the second through hole when the blocking member slides down to the bottom of the venting passage; and
   avoid the second through hole when the blocking member rises to the top of the venting passage.

7. The cooking appliance according to claim 1, wherein the lid comprises a push bar configured to extend outside the second through hole.

8. The cooking appliance according to claim 1, wherein the lateral wall of the venting passage further comprises an abutting structure located at a middle portion of the venting passage, and when the blocking member is at the bottom or top of the venting passage, a top or bottom of the blocking member is configured to cooperate respectively with the abutting structure in a position limiting manner.

9. The cooking appliance according to claim 8, wherein the abutting structure is in a ring shape and arranged around a circumference of the venting passage, the top of the blocking member has a first abutting flange configured to cooperate with the abutting structure, and the bottom of the blocking member has a second abutting flange configured to cooperate with the abutting structure.

10. The cooking appliance according to claim 9, wherein the blocking member further comprises a sealing ring arranged on at least one of the second abutting flange or the first abutting flange.

11. The cooking appliance according to claim 1, wherein the blocking member comprises:
a top cup comprising a top having a first abutting flange extending outwards; and
a bottom cup mounted below the top cup, the bottom cup comprises a bottom having a second abutting flange extending outwards.

12. The cooking appliance according to claim 11, wherein a bottom of the top cup has a plurality of first connecting members extending inwards and spaced apart around an inner wall of the top cup, a top of the bottom cup has a plurality of second connecting members that cooperate with the first connecting members, and the blocking member further comprises a fastening member configured to connect the first connecting members and the second connecting members.

13. The cooking appliance according to claim 1, wherein the blocking member has a mesh structure arranged inside the blocking member.

14. The cooking appliance according to claim 1, wherein the lid body comprises a connecting cylinder and an abutting cylinder which are coaxially arranged to form the venting passage, the connecting cylinder being located above the abutting cylinder, the connecting cylinder having one through hole of the two through holes, and the abutting cylinder having the other through hole of the two through holes.

15. The cooking appliance according to claim 14, wherein an inner wall of the abutting cylinder has an abutting structure extending towards a center of the abutting cylinder.

16. The cooking appliance according to claim 1, wherein the blocking member further comprises a sealing ring that abuts against an inner wall of the venting passage so as to seal the gap between the blocking member and the venting passage.

17. The cooking appliance according to claim 1, wherein the blocking member comprises an abutting flange, the baking assembly further comprises a reflecting shell arranged below the lid body and having a passing hole in communication with the venting passage, the area of the passing hole is smaller than an opening area of the venting passage, the blocking member is arranged in the venting passage, and a bottom surface of the abutting flange is configured to abut the reflecting shell and to seal the venting passage.

* * * * *